(12) United States Patent
Little

(10) Patent No.: US 11,679,855 B2
(45) Date of Patent: Jun. 20, 2023

(54) SYSTEM FOR THE STRUCTURE, CONTROL, AND ENERGY MANAGEMENT OF LOW-PRESSURE CELLS FOR AEROSTATIC LIFT

(71) Applicant: Anumá Aerospace, LLC, Raleigh, NC (US)

(72) Inventor: James Douglas Little, Raleigh, NC (US)

(73) Assignee: Anumá Aerospace, LLC, Raleigh, NC (US)

( * ) Notice: Subject to any disclaimer, the term of this patent is extended or adjusted under 35 U.S.C. 154(b) by 326 days.

(21) Appl. No.: 16/841,798

(22) Filed: Apr. 7, 2020

(65) Prior Publication Data
US 2021/0309337 A1   Oct. 7, 2021

(51) Int. Cl.
| | |
|---|---|
| *B64B 1/06* | (2006.01) |
| *B64B 1/08* | (2006.01) |
| *B64B 1/14* | (2006.01) |
| *B64B 1/64* | (2006.01) |
| *B64B 1/62* | (2006.01) |
| *B64D 31/02* | (2006.01) |
| *B60L 50/64* | (2019.01) |
| *B60L 8/00* | (2006.01) |
| *B64D 27/24* | (2006.01) |

(52) U.S. Cl.
CPC ............... *B64B 1/06* (2013.01); *B60L 8/003* (2013.01); *B60L 50/64* (2019.02); *B64B 1/08* (2013.01); *B64B 1/14* (2013.01); *B64B 1/62* (2013.01); *B64B 1/64* (2013.01); *B64D 27/24* (2013.01); *B64D 31/02* (2013.01); *B60L 2200/10* (2013.01); *B64D 2211/00* (2013.01)

(58) Field of Classification Search
CPC .... B64B 1/06; B64B 1/08; B64B 1/14; B64B 1/62; B64B 1/64; B60L 8/003
See application file for complete search history.

(56) References Cited

U.S. PATENT DOCUMENTS

| | | | |
|---|---|---|---|
| 205,319 A | 6/1878 | Tracy | |
| 1,390,745 A * | 9/1921 | Armstrong | ............... B64B 1/62 244/30 |
| 1,675,009 A * | 6/1928 | Barnes | ...................... B64B 1/00 244/125 |
| 4,032,086 A | 6/1977 | Cooke | |
| 4,113,206 A * | 9/1978 | Wheeler | ................... B64B 1/08 52/63 |

(Continued)

FOREIGN PATENT DOCUMENTS

CA       2808001 A1 *   8/2014   ............... F03D 1/04

*Primary Examiner* — Michael H Wang
(74) *Attorney, Agent, or Firm* — Nelson Mullins Riley & Scarborough LLP

(57) ABSTRACT

A structural system for lifting cells, constructed of modular, lightweight framing supporting thin, lightweight, single-ply or laminated, air-impermeable membranes, that maintain near constant-volume under low pressure for aerostatic lift in lighter-than-air aircraft; a system for controlling that aerostatic lift in a single or a plurality of such lifting cells, using electrically-powered vacuum pumps and valves; and a system for recovering electrical energy expended during ascent by using the inflow of air into the lifting cells during descent to generate electricity.

20 Claims, 14 Drawing Sheets

(56) References Cited

U.S. PATENT DOCUMENTS

| | | | | |
|---|---|---|---|---|
| 5,285,986 | A * | 2/1994 | Hagenlocher | B64B 1/60 |
| | | | | 244/30 |
| 5,645,248 | A * | 7/1997 | Campbell | B64B 1/08 |
| | | | | 244/30 |
| 9,266,597 | B1 * | 2/2016 | Pasternak | B64B 1/08 |
| 9,828,081 | B1 * | 11/2017 | DeVaul | B64B 1/44 |
| 10,843,783 | B1 * | 11/2020 | Cranston | B64B 1/62 |
| 2010/0239797 | A1 * | 9/2010 | Alavi | B32B 27/12 |
| | | | | 156/190 |
| 2011/0101692 | A1 * | 5/2011 | Bilaniuk | F03D 13/20 |
| | | | | 290/55 |
| 2012/0018571 | A1 * | 1/2012 | Goelet | B64B 1/005 |
| | | | | 244/30 |
| 2012/0037748 | A1 * | 2/2012 | Schneider | B64B 1/14 |
| | | | | 244/128 |
| 2017/0021907 | A1 * | 1/2017 | Rapport | B64B 1/14 |

* cited by examiner

SYSTEM FOR THE STRUCTURE, CONTROL, AND ENERGY MANAGEMENT OF LOW-PRESSURE CELLS FOR AEROSTATIC LIFT

BACKGROUND OF THE INVENTION

Field of the Invention

The invention relates generally to the structural system, control system, and energy management system of solar-electric, lighter-than-air aircraft using constant-volume, -variable-buoyancy lifting cells. More specifically, this invention relates to the structural system for creating spherical lifting cells consisting of geodesic frames built of modular parts supporting air-impermeable membranes, which can be partially evacuated of air for the purpose of air displacement to increase buoyancy, or aerostatic lift in solar-electric, lighter-than-air aircraft. The invention also includes a control system using electrically-driven vacuum pump(s), valves, and pressure sensors to regulate the pressure within the spherical lifting cell(s). Further, the invention includes an energy management and storage system which enables the collection and storage of electrical energy from a solar array, and a mechanism through which some of the electrical energy expended while evacuating air from the spherical lifting cell(s) for ascent is recovered and stored during descent.

Background of the Invention

Current lighter-than-air aircraft use helium for the purpose of displacing air within the aircraft to provide aerostatic lift. Helium gas is relatively heavy, having twice the weight of hydrogen gas. Helium is an expensive, nonrenewable resource. Helium's small molecular size leads to its seepage through even the best gas-impermeable membranes, requiring that it be regularly replenished.

Hydrogen is both lighter and less expensive than helium. However, hydrogen's smaller molecular size leads to an increased seepage rate when compared to helium. Additionally, due to the flammability of hydrogen gas, it is dangerous and has been banned from use in -lighter-than-air aircraft.

Due to the seepage of helium or hydrogen through the envelopes of lighter-than-air aircraft operating with lifting gas, these aircraft are unable to remain aloft without lifting gas replenishment.

Lighter-than-air aircraft operating with lifting gas require ballonets for the regulation of lifting gas pressure due to variances in temperature, altitude, and atmospheric pressure, which add weight and complexity to the aircraft.

Operators of lighter-than-air aircraft using lifting gas have limited control over buoyancy, as lifting gas pressure can be required to maintain aircraft shape and structural integrity. Buoyancy is controlled by dumping ballast to increase aerostatic lift and either releasing or recompressing lifting gas to decrease aerostatic lift. Lighter-than-air aircraft operating with lifting gas are usually partially buoyant when landed, creating difficult and sometimes dangerous ground operations, particularly in wind or gusts. In order to remain grounded, such aircraft usually require large ground crews handling mooring lines; specialized mooring and storage equipment; and the addition of ballast as cargo is unloaded.

Current lighter-than-air aircraft use lifting gas inside their lifting envelopes, regulated at pressures just above the external pressure (which varies with altitude) to maintain their shape, structural integrity, and to prevent rupture of their envelopes. The limited pressure differential between the inside and outside of the lifting envelope negates the possibility of using the lifting envelope as an energy storage device.

In order to overcome the limitations of lighter-than-air aircraft operating with lifting gas, it is desirable to develop an alternative. It has been known since it was first proposed in 1670 by the father of aeronautics, Francesco Lana de Terzi, that full vacuum envelopes would be the ultimate provider of aerostatic lift. Full vacuum envelopes have been, and continue to be, impractical due to physical and materials limitations.

Therefore, there remains a need for a practical aerostatic lift system that overcomes the excessive mass, expense, and seepage of helium; the flammability and seepage of hydrogen; and the impracticality of full vacuum envelopes.

BRIEF SUMMARY OF THE INVENTION

The present invention solves problems associated with the prior art by providing a structural system for low-pressure, or partial-vacuum, lifting cells for generating aerostatic lift, wherein the lifting cells are spherical, rigid, geodesic frames supporting air-impermeable membranes, and wherein the geodesic frames are constructed of arched-beam struts supported by cable tendons and connected together by modular hubs. The invention also includes a control system consisting of an electrically-driven vacuum pump or pumps, control valves, and pressure sensors to partially evacuate and regulate the internal pressure of the spherical lifting cell(s) for the purpose of controlling aerostatic lift.

In addition, this invention includes an energy management and storage system that utilizes a solar photovoltaic array to charge batteries, thereby providing electrical power to the control system for regulation of pressure within the spherical lifting cells, and which may leverage "regenerative descent," wherein the inrush of air through the vacuum pump(s) into the spherical lifting cell(s) during aircraft descent is used to generate electrical energy for storage in the batteries, thereby recovering some of the energy which was expended running the vacuum pump(s) during aircraft ascent.

DETAILED DESCRIPTION OF THE INVENTION

Figure 1:
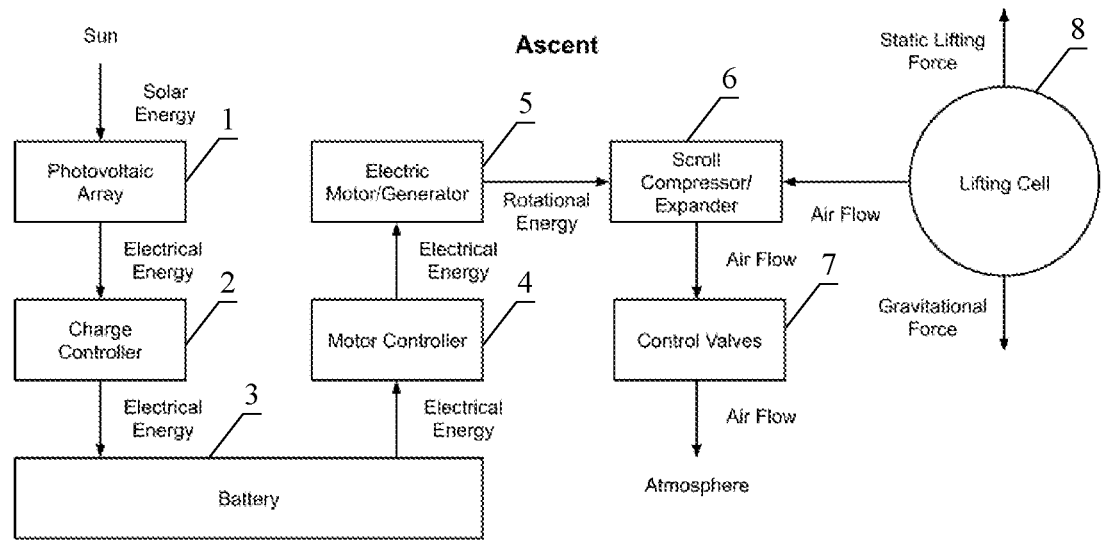
FIG. 1 depicts a schematic diagram showing the flow of energy and air during the ascent phase of flight.

This disclosure includes a system for producing positive aerostatic lift with one or more low-pressure, or partial-vacuum, spherical lifting cells. Referring now to the drawings, FIG. 1 depicts a schematic diagram showing the flow of energy and air during the ascent phase of flight for a system for producing positive aerostatic lift with low-pressure, or partial-vacuum, spherical lifting cell(s) 8. In this system, electrical energy is generated using a photovoltaic array 1, the generated electrical energy being passed to a charge controller 2, which safely regulates and limits the charging rate of the battery 3, which serves the purpose of energy storage. When aircraft ascent is desired, the operator initiates the air outflow control valve 7, and the motor controller 4 to allow electrical current to run the electrical motor 5, which turns the compressor 6, thereby evacuating air from the spherical lifting cell(s) 8. Air is evacuated from the spherical lifting cell(s) 8, until positive aerostatic lift, or buoyancy, is achieved. The aircraft would rise to an altitude where it achieves neutral buoyancy, at which time, more air may be evacuated from the spherical lifting cell(s) 8, in order to achieve increased altitude, up to the prescribed mechanical limits of the system.

Figure 2:
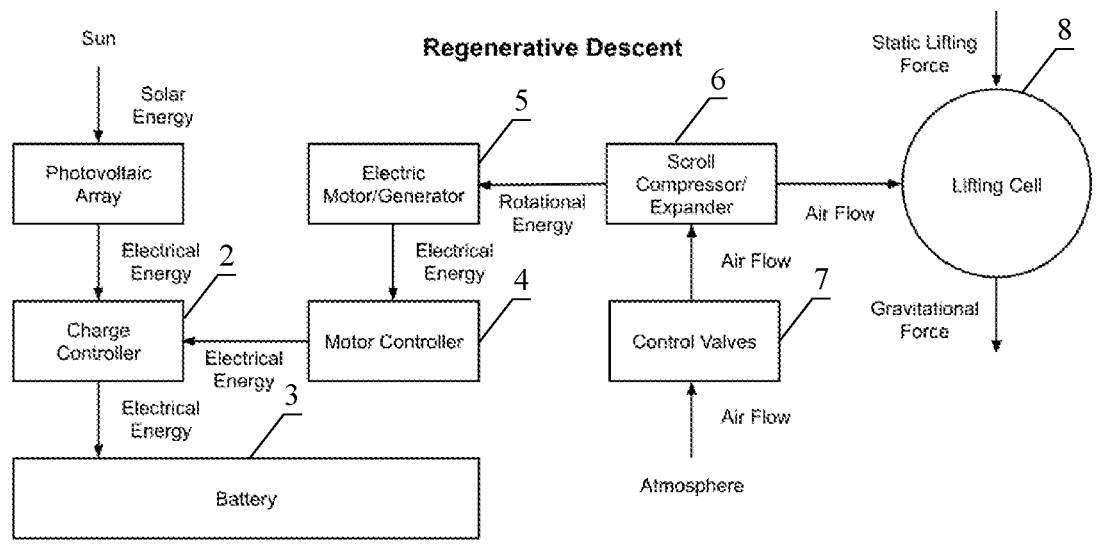
FIG. 2 depicts a schematic diagram showing the flow of energy and air during regenerative descent.

Referring to FIG. 2, the invention enables the recovery of a portion of the electrical energy expended during aircraft ascent, by utilizing the inrush of atmospheric air into the partially evacuated spherical lifting cell(s) 8 during aircraft descent to generate electricity, returning the electrical energy to the battery 3 for storage. This system is referred to as regenerative descent. When aircraft descent is desired, the operator would initiate the air inflow control valve 7, which allows the higher-pressure external air to flow through the compressor 6 (acting as an expander), into the lower-pressure spherical lifting cell(s) 8. The air flow through the compressor 6 (expander) turns the electric motor 5 (acting as a generator), to produce electrical energy, which the motor controller 4 shunts to the charge controller 2 for storage in the battery 3. The aircraft would sink under the influence of gravity as air refills the spherical lifting cell(s) 8, decreasing aerostatic lift, or buoyancy.

Figure 3:
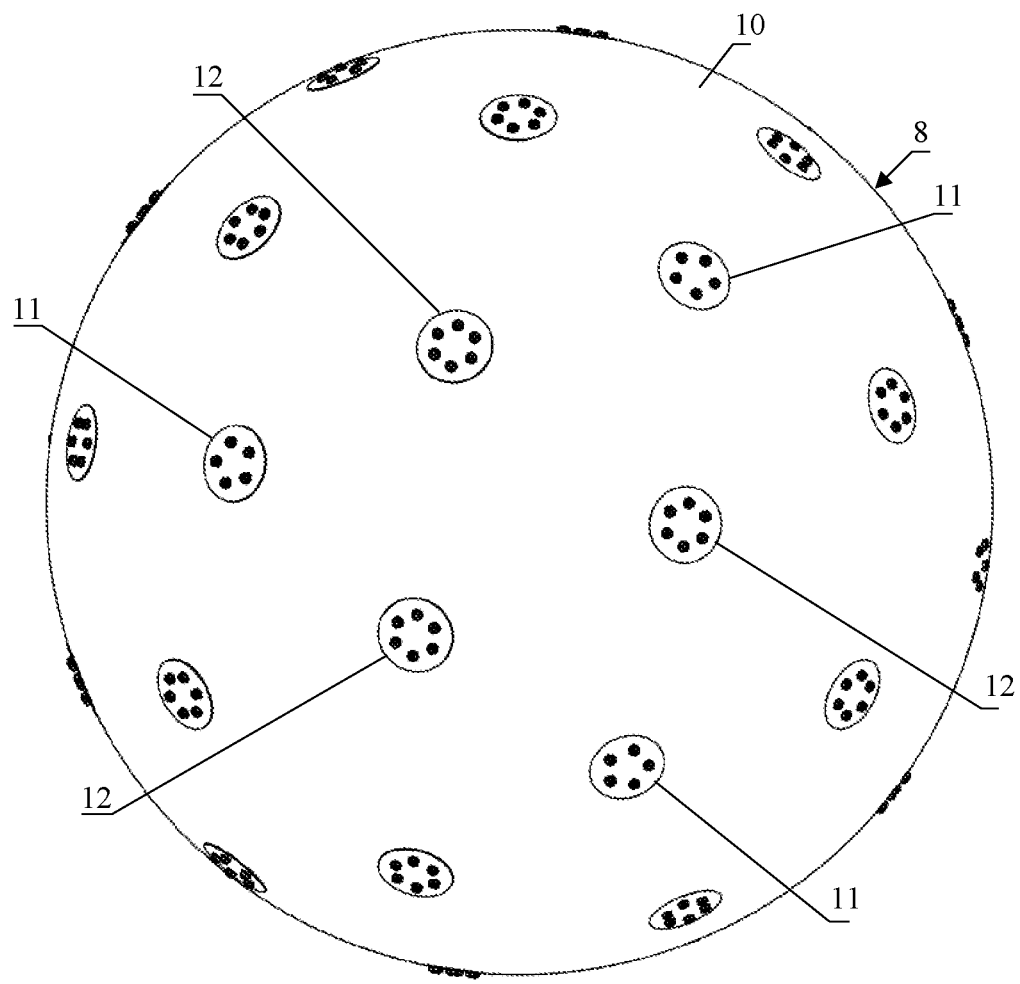
FIG. 3 depicts an example of an assembled spherical lifting cell.

Referring to FIG. 3, the invention is a spherical lifting cell 8, which consists of a spherical, icosahedral-based (twenty triangular sides), geodesic frame covered with an air-impermeable membrane 10. The membrane 10 is held to the frame by a sealing gasket, and a cover plate on each frame hub, bolted in place by either five bolts on the twelve (12) five-point hubs 11, or by six bolts on the six-point hubs 12.

The number of six-point hubs 12 required varies dependent upon geodesic frequency (frequency indicating how many times the sides of the icosahedral base triangle are subdivided) of the required spherical lifting cell frame. The three labeled five-point hubs 11, form one of the twenty icosahedral "sides" of the geodesic construction. The spherical lifting cell 8 can be partially evacuated of air to create aerostatic lift, or buoyancy, within an atmosphere.

Figure 4:
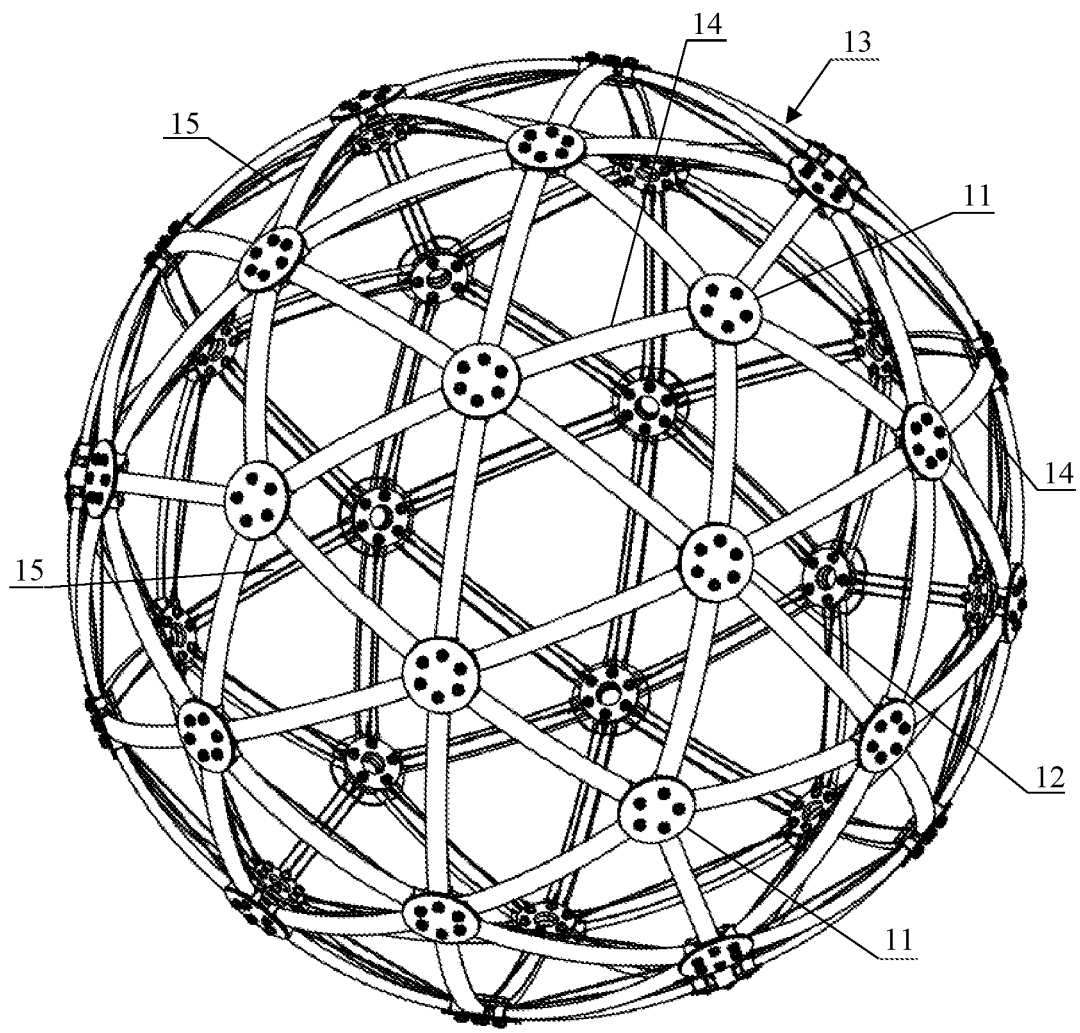
FIG. 4 depicts an example of an assembled spherical lifting cell frame without membrane attached.

Referring to FIG. 4, the spherical lifting cell frame 13, shown without the air-impermeable membrane attached, consists of arched struts 14, of which the number and lengths vary dependent upon the geodesic frequency of the required spherical lifting cell frame 13, attached to five-point hubs 11 and six-point hubs 12. Each arched strut 14 is reinforced with a cable tendon 15 attached to the five-point hubs 11 and the six-point hubs 12 directly beneath the ends of each arched strut 14. In certain aspects of this disclosure, the spherical lifting cell frame 13 has a geodesic frequency of two, indicating that each of the twenty icosahedral sides formed by the twelve (12) five-point hubs 11, is divided into two, with six-point hubs 12 set between (shown), for a total of thirty (30) six-point hubs 12, connected together with one hundred and twenty arched struts 14, reinforced with one hundred and twenty cable tendons 15.

In other aspects of the present disclosure, the spherical lifting cell frame 13, has a geodesic frequency of four, indicating that each of the twenty icosahedral sides formed by the twelve (12) five-point hubs 11, is divided into four, with six-point hubs 12 set between, and with the arched struts 14 that would cross the face of the icosahedral sides being similarly divided, for a total of one hundred and fifty (150) six-point hubs 12, and four hundred and eighty arched struts 14, reinforced with four hundred and eighty cable tendons 15. In some aspects of this disclosure, the spherical lifting cell frame 13 has a geodesic frequency of eight, indicating that each of the twenty icosahedral sides formed by the twelve (12) five-point hubs 11, is divided into eight, with six-point hubs 12 set between, and with the arched struts 14 that would cross the face of the icosahedral sides being similarly divided, for a total of six hundred and thirty (630) six-point hubs 12, and one thousand, nine hundred and twenty arched struts 14, reinforced with one thousand, nine hundred and twenty cable tendons 15.

Figure 5:
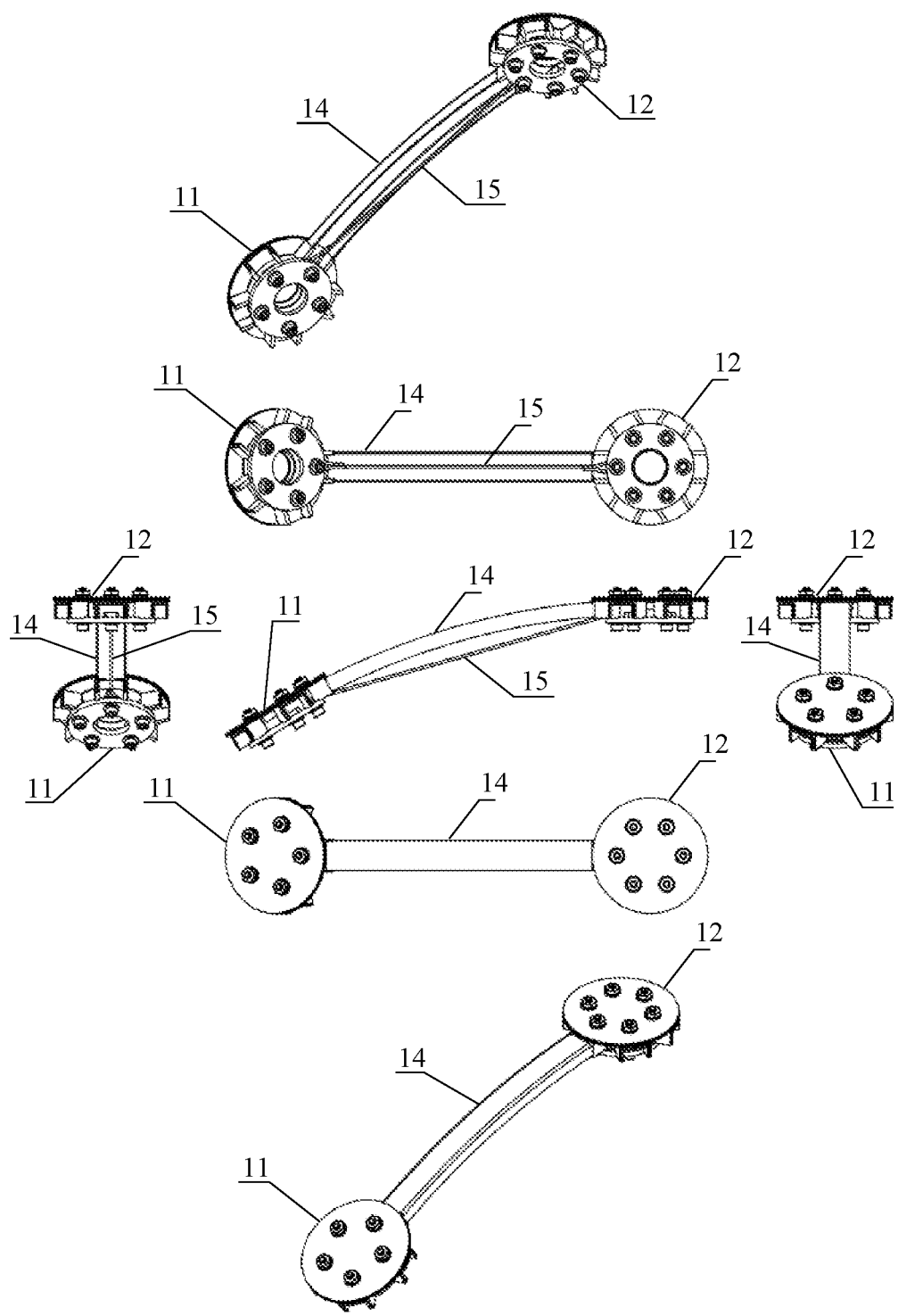
FIG. 5 depicts a seven-view drawing showing an example of how a five-point spherical lifting cell frame hub is connected with an arched strut and cable tendon to a six-point spherical lifting cell frame hub.

Referring to FIG. 5, the arched strut 14 attaches to both the five-point hubs 11 and the six-point hubs 12, with each arched strut 14 being reinforced by a cable tendon 15, attaching to both the five-point hubs 11 and the six-point hubs 12, just below the arched strut 14 ends.

Figure 6:
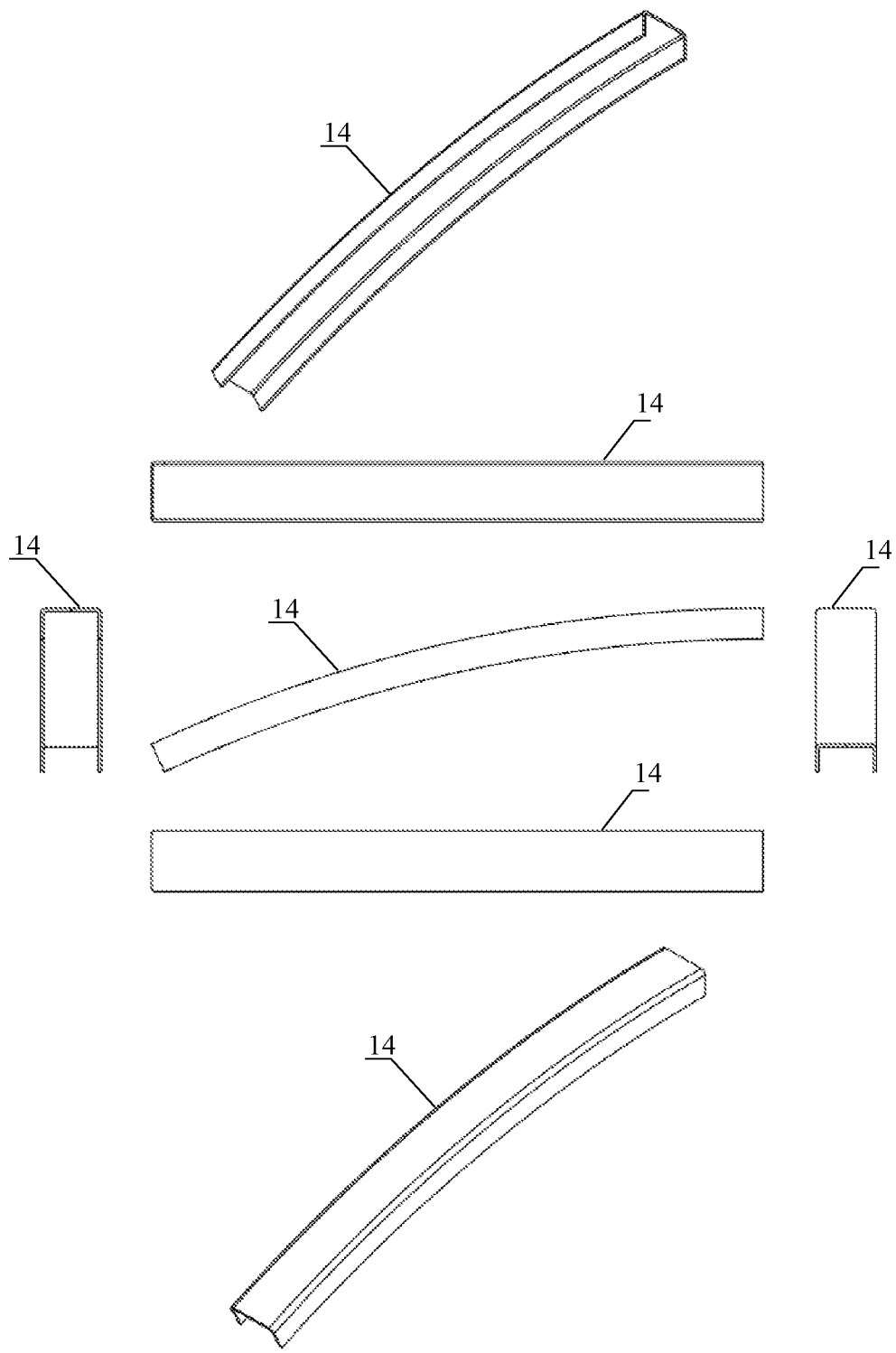
FIG. 6 depicts a seven-view drawing of an example of a spherical lifting cell frame arched strut.

FIG. 6 shows an example of an arched strut 14 with a C-shaped profile for beam strength. In some examples, certain aspects allow spherical lifting cells of various diameters and the arched struts 14 to be manufactured to match the arc of the radius of the desired spherical lifting cell. The arched struts may be manufactured in continuous lengths and cut to the necessary length as determined by spherical lifting cell frame geodesic frequency, and the specific position of the arched strut within the spherical lifting cell frame. As high strength and low weight are required in the arched struts 14, in one example, the arched struts 14 may be manufactured with carbon fiber reinforced polymer. But, in other examples, other materials may be used, such as aluminum or titanium.

Figure 7:
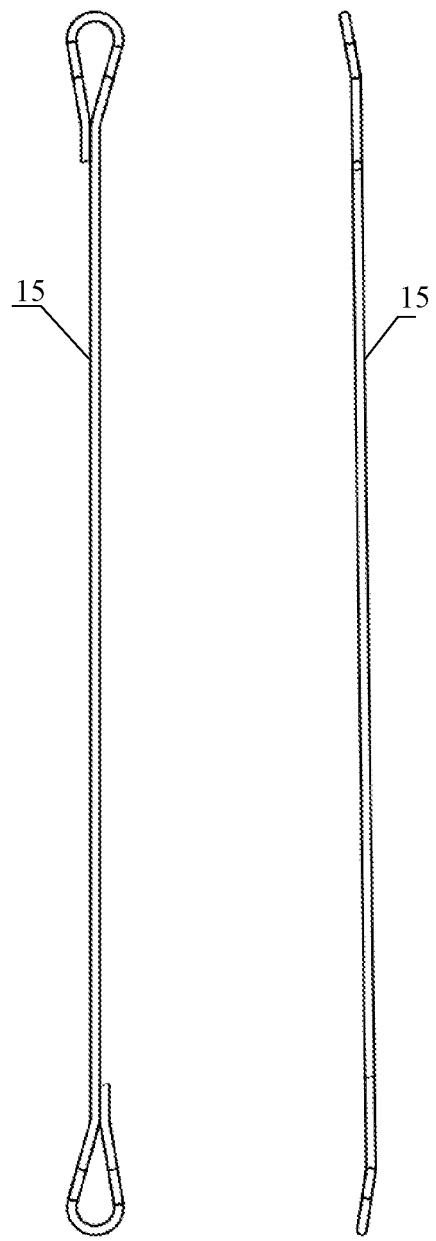
FIG. 7 depicts a two-view drawing of an example of a spherical lifting cell frame cable tendon.

FIG. 7 shows an example of a cable tendon 15 with looped ends for attaching around the posts of the strut receivers. The cable tendons 15 provide tension to resist the forces tending to flatten the arched struts. As light weight, low stretch, and low creep are required in the cable tendons 15, they are manufactured from multi-stranded braided aramid cord. In certain aspects of this disclosure the cable tendon 15 can include loops that may be spliced. In some examples, these loops may be whipped. And in one example, both techniques may be used in combination.

Figure 8:
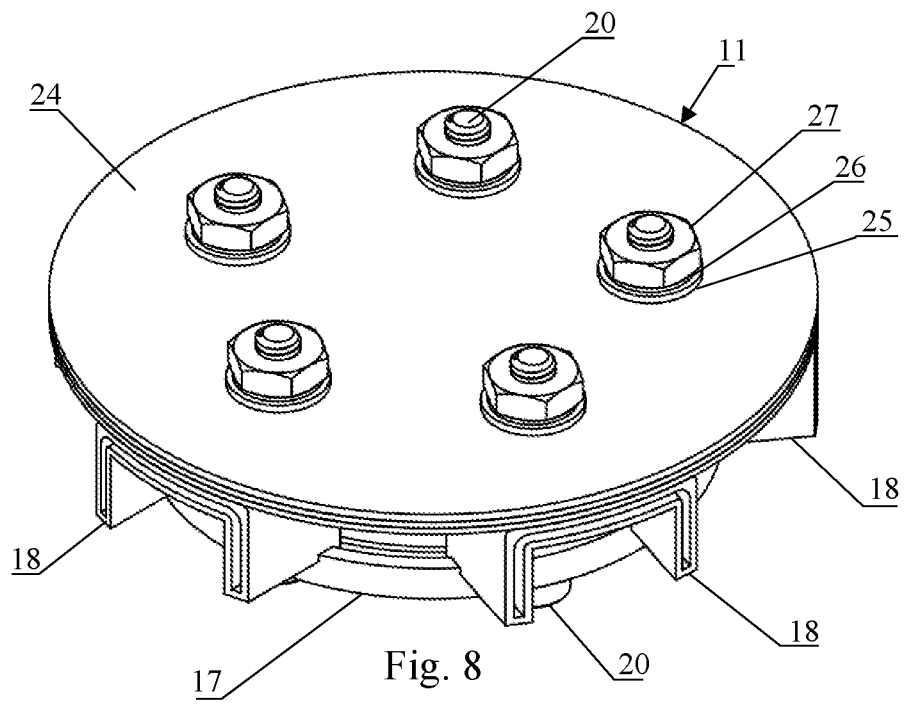
FIG. 8 depicts an example of an assembled five-point spherical lifting cell frame hub.

FIG. 8 shows an example of a five-point hub 11, with visible parts consisting of the hub core plate 17, onto which fit the strut receivers 18, which have slots into which the struts fit, the top cover 24, the five-point hub 11 secured with five flat washers 25, five locking washers 26, and five threaded nuts 27, fitting onto five threaded bolts 20.

Figure 9:
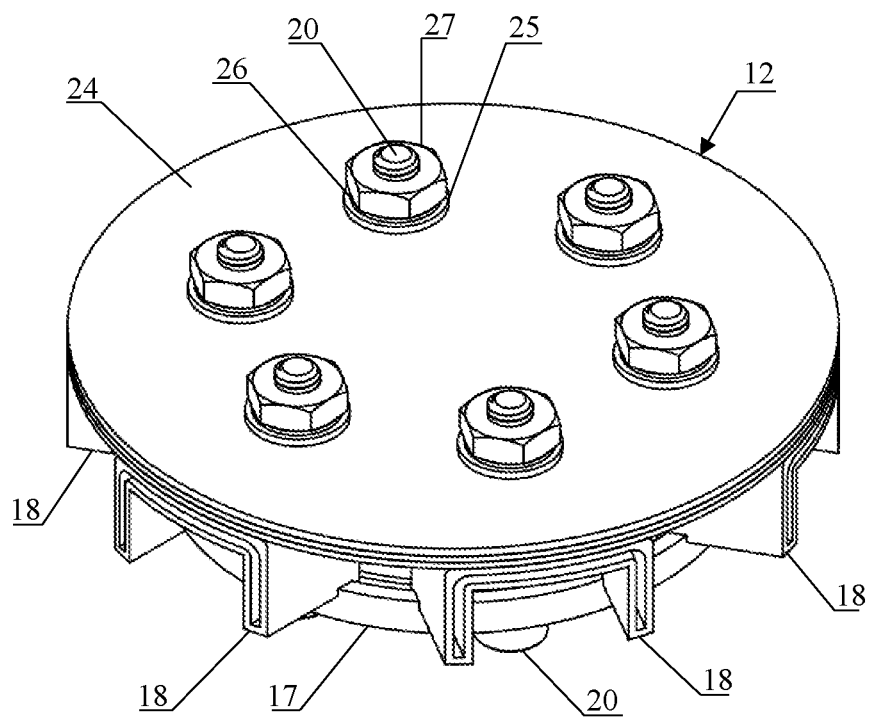
FIG. 9 depicts an example of an assembled six-point spherical lifting cell frame hub.

FIG. 9 shows an example of a six-point hub 12, with visible parts consisting of the hub core plate 17, onto which fit the strut receivers 18, which have slots into which the struts fit, the top cover 24, the six-point hub 12 secured with six flat washers 25, six locking washers 26, and six threaded nuts 27, fitting onto six threaded bolts 20.

Figure 10:
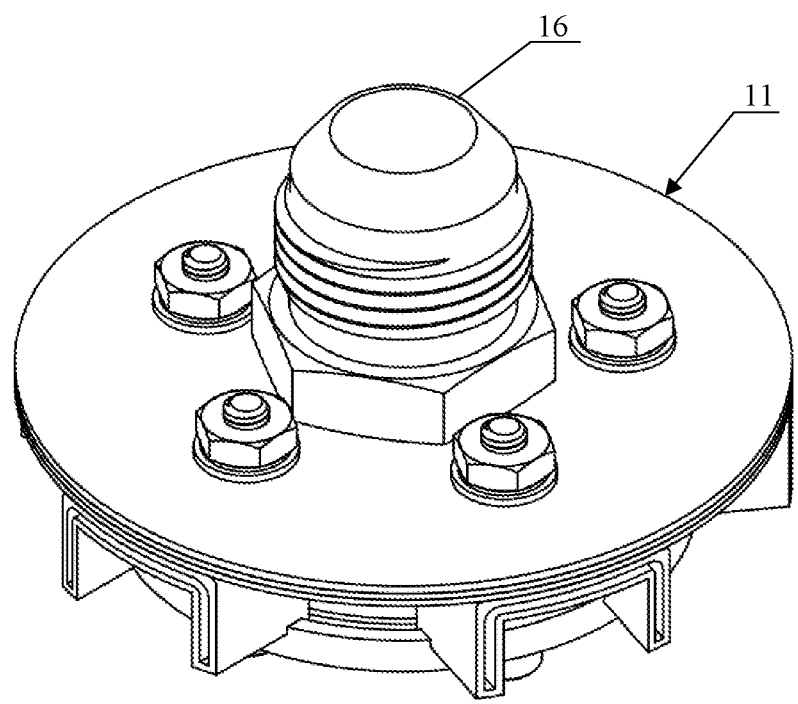
FIG. 10 depicts an example of an assembled five-point spherical lifting cell frame hub which has been ported for plumbing connection to the vacuum pump system.

FIG. 10 shows an example of a five-point hub 11, which is ported, threaded, and fitted with a threaded plumbing fitting 16. The invention allows the five-point hubs 11 and the six-point hubs to be ported in this manner for attachment of plumbing for air flow out of and into the spherical lifting cells, as well as the fitting of various sensors, such as pressure or temperature sensors.

Figure 11:
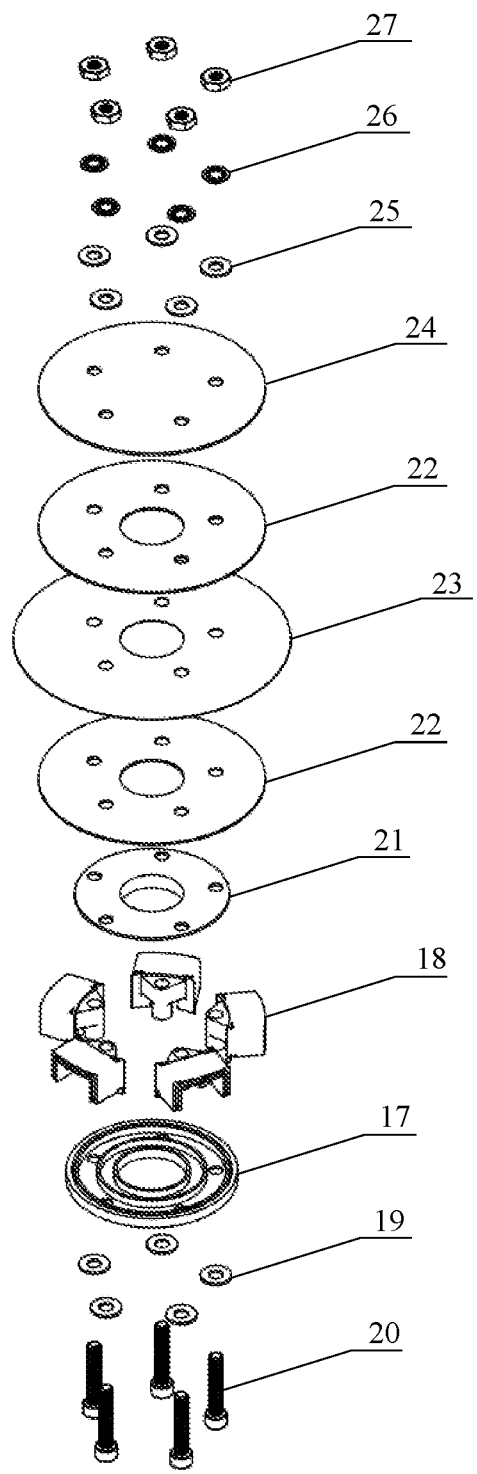
FIG. 11 depicts an exploded view of an example of a five-point spherical lifting cell frame hub showing the relative positions of parts.

FIG. 11 shows an example of an exploded view of a spherical lifting cell frame hub, configured as a five-point hub. Assembly of a spherical lifting cell frame hub would be accomplished by determining the position of the hub in the spherical lifting cell frame, to determine the number of required bolt holes and the relative angular positions of the bolt holes around the hub central axis, in order to accurately drill the hub core plate 17, the hub sealing plate 21, two gaskets 22, and the hub top cover 24. Once the holes have been drilled, assembly proceeds with the arched struts being fitted into the requisite number of strut receivers 18 (either five or six), and cable tendons being looped around the posts of the strut receivers 18 and oriented through the cable tendon windows in the base of the strut receivers 18, and parallel to the arched struts. The lower tabs of the strut receivers 18 are then fitted into the receiver slot of the hub core plate 17 and a flat washer 19 and a bolt 20 are screwed into the threaded post of each strut receiver 18, securing the strut receivers 18, the attached struts, and the cable tendons to the hub core plate 17. The sealing plate 21 is then fitted onto the bolts 20, sliding down to fit into the space created by the strut receivers 18, and creating a flat surface for the first gasket 22 to fit across both the sealing plate 21 and the strut receivers 18. At this point, the top cover 24, washers 25, and nuts 27 may be temporarily affixed while the remainder of the spherical lifting cell frame is assembled. Once each hub, arched strut, and cable tendon of the spherical lifting cell frame is configured and assembled, the threaded nuts 27, flat washers 25, and top covers 24, which were temporarily affixed, may be removed. If not previously installed, a gasket 22 is now placed across the sealing plate 21 and the strut receivers 18. Now the air-impermeable membrane 23 is attached in partial sections and the section edges sealed, followed by a second gasket 22. The top covers 24 are then placed onto the spherical lifting cell frame hubs, and secured with flat washers 25, locking washers 26, and threaded nuts 27. In certain aspects of this disclosure, the air-impermeable membrane 23 is a single ply of aluminized biaxially-oriented polyethylene terephthalate with the edges heat sealed. In some aspects of this disclosure, the air-impermeable membrane 23 is made of two layers of biaxially-oriented polyethylene terephthalate, at least one of which is aluminized, which are layered on a 90 degree bias with each other, and which sandwich a woven mesh of fine aramid fiber cord between them. Other examples of air-impermeable membranes 23 may include single and/or multiple-ply configurations of various other materials that can also be used.

Figure 12:
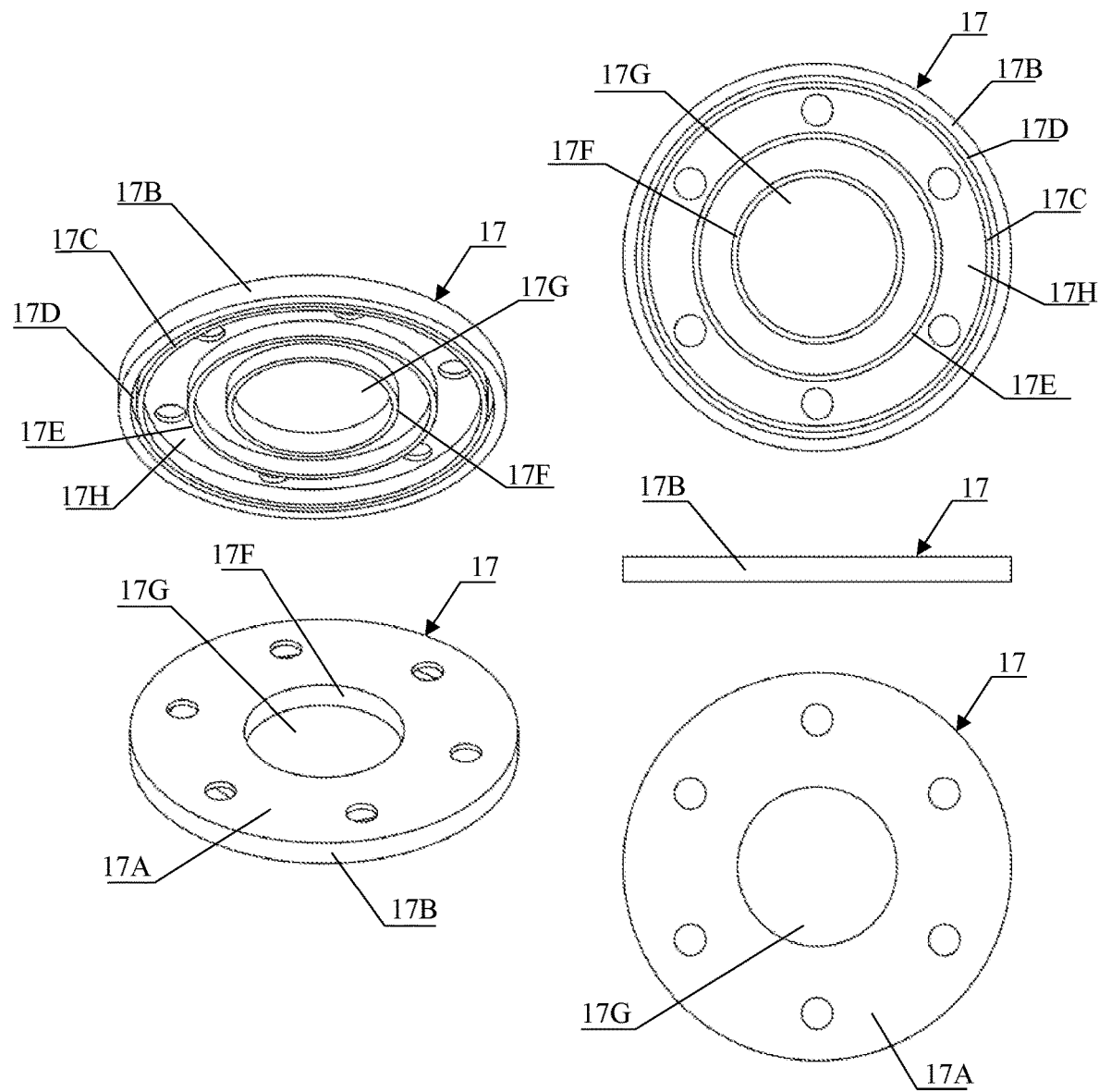
FIG. 12 depicts a five-view drawing of an example of a six-point spherical lifting cell frame hub core plate.

FIG. 12 shows an example of a hub core plate 17. It is shown here in a six-point hub configuration, but it should be noted that the hub core plates 17 can be manufactured without bolt holes, so that the same hub core plates 17 may be configured as either five-point or six-point hubs, and so that the holes may be drilled at varying relative angles around the central axis to accommodate the need for the various angles required in construction of spherical lifting cell frames of different geodesic frequencies. The hub core plates 17 are designed with a flat bottom surface 17A for the flat washer and bolts to rest. The upper surface has raised ridges to increase stiffness and strength. The outer ridge 17B is thickened for additional strength. Outer ridge 17B and adjacent ridge 17C form a slot 17D between them, into which the tabs on the strut receivers fit. Adjacent ridge 17C and bolt ridge 17E provide stiffness on either side of the bolt hole ring 17H. Central ridge 17F provides stiffness and a passageway 17G for air or sensor instrumentation. High strength and low weight are required in the hub core plates 17. In certain aspects of this disclosure, the hub core plates 17 are manufactured with carbon fiber reinforced polymer, but in other embodiments other materials may be used, such as aluminum or titanium.

Figure 13:
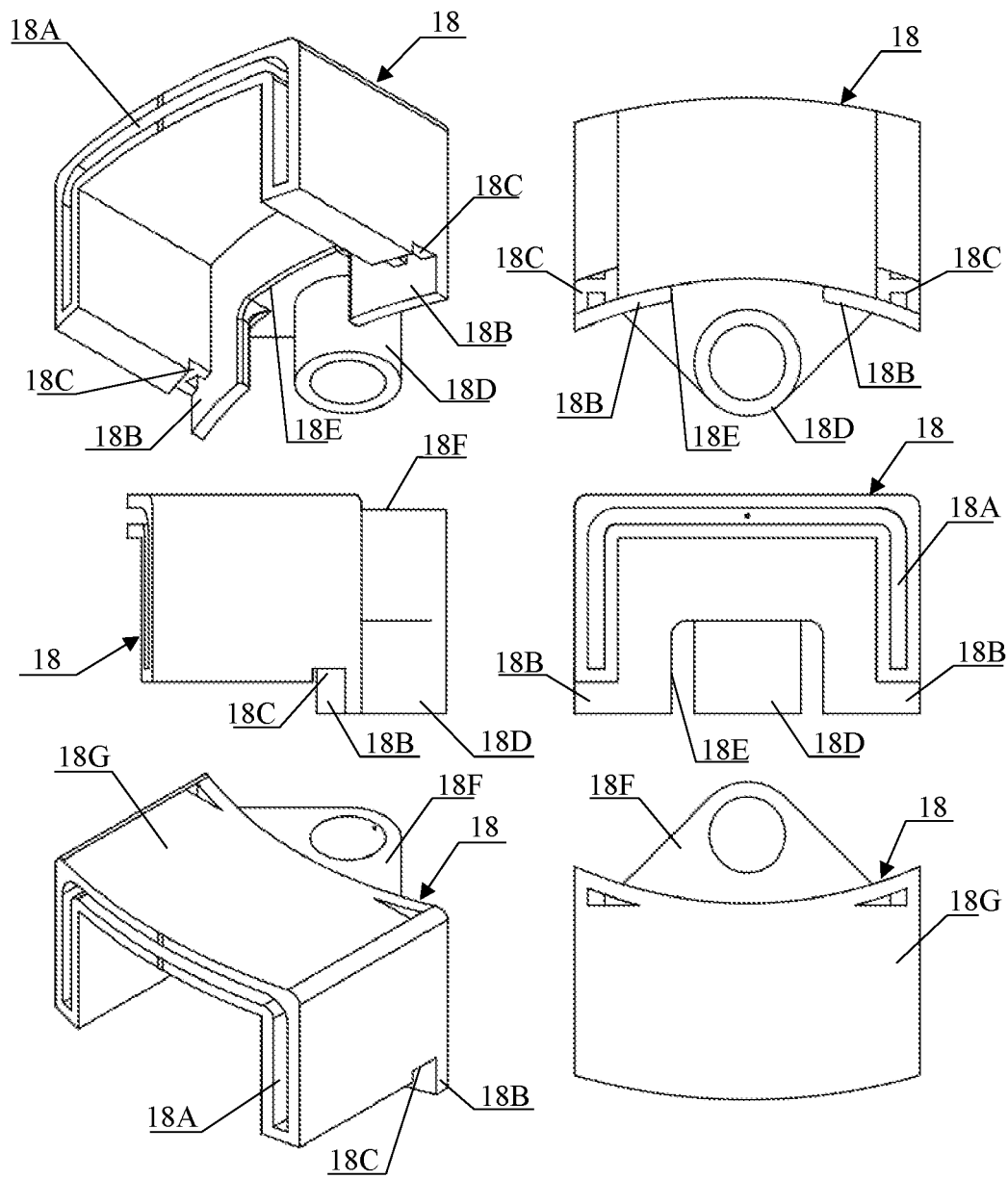
FIG. 13 depicts a six-view drawing of an example of a spherical lifting cell frame hub strut receiver.

FIG. 13 shows an example of a strut receiver 18. The strut receiver 18 features a C-shaped slot 18A into which fit the arched struts. Two lower tabs 18B fit into the slot in the hub core plate. Two grooves 18C lock the strut receiver over the outer ridge of the hub core plate, assisting in holding it in place. The strut receiver post 18D fits into the bolt hole ring of the hub core plate, provides an attachment point for the cable tendon loops, and is threaded. This provides a mechanism for tightening it into place with threaded bolts. The strut receiver has a window opening 18E, for the cable tendons to pass through. The edges of the window opening 18E are filleted to avoid abrasion of the cable tendons. The top surface 18F of the strut receiver post 18D is flat and recessed to provide a surface for the hub sealing plate to fit, creating a continuous flat surface with the strut receiver top 18G for a gasket. High strength and low weight are required for the strut receivers 18. In certain aspects of this disclosure, the strut receivers 18 are manufactured with carbon fiber reinforced polymer, but in other embodiments other materials may be used, such as aluminum or titanium.

Figure 14:
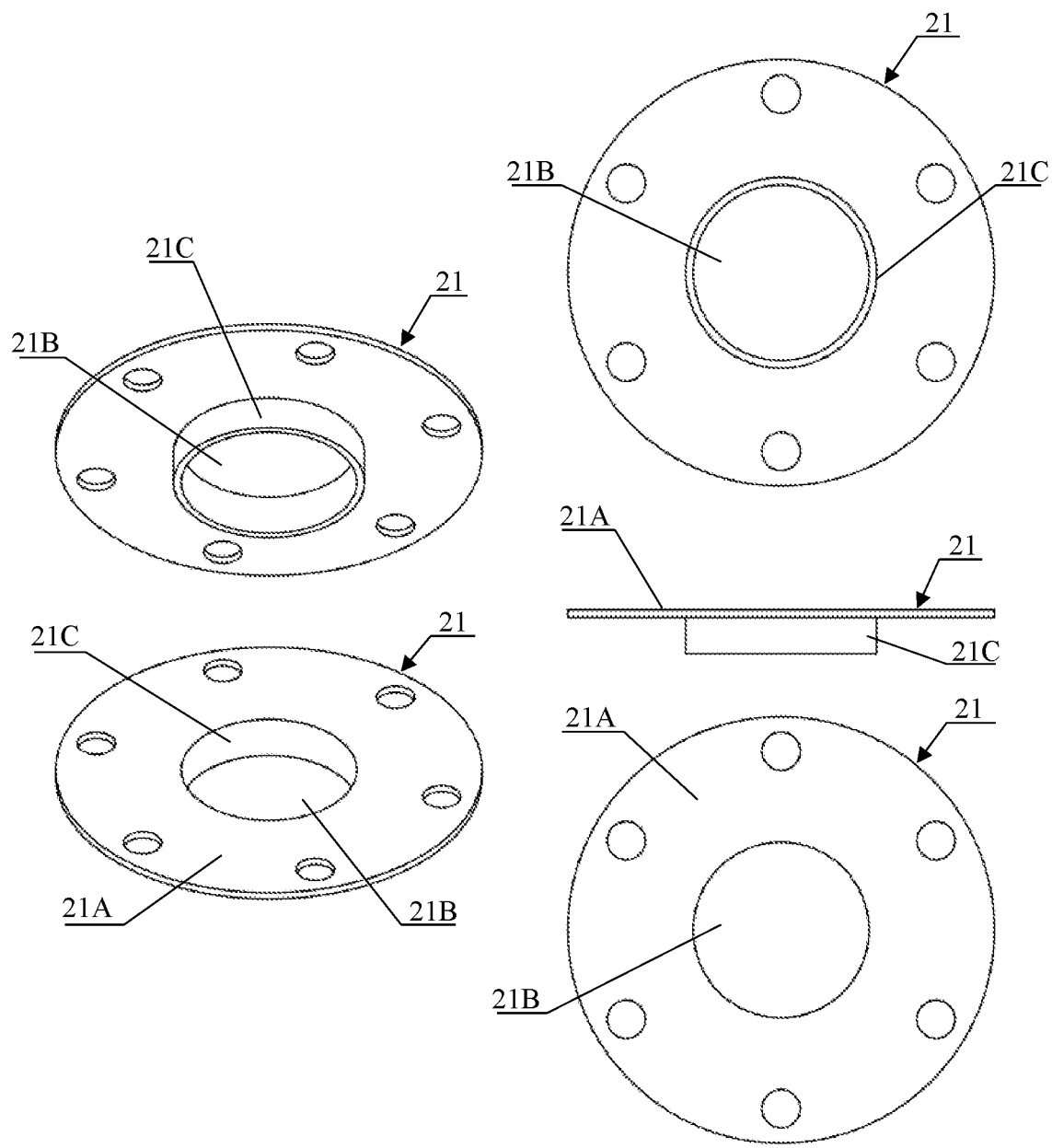
FIG. 14 depicts a five-view drawing of an example of a six-point spherical lifting cell frame hub sealing plate.

FIG. 14 shows an example of a hub sealing plate 21. As with the hub core plate, the hub sealing plate 21 can be produced without bolt holes, such that the same part may be adapted (by appropriate drilling) to any hub position within the spherical lifting cell frame. The hub sealing plate 21 has an outer diameter matching the interior diameter formed by the strut receivers when they are mounted on the hub core plate. The hub sealing plate 21 has a flat top surface 21A to provide a resting surface for a gasket. The hub sealing plate 21 has an open central core 21B formed by a central tube 21C. The open central core 21B allows for the passage of air and sensor instrumentation. The central tube 21C provides the wall of the open central core 21B, adds stiffness to the part, and provides an internal surface which may be threaded to receive threaded plumbing fittings or sensor instrumentation. High strength and low weight are required for the hub sealing plate 21. In certain aspects of this disclosure, the hub sealing plates 21 are manufactured with carbon fiber reinforced polymer, but in other embodiments other materials may be used, such as aluminum or titanium.

Figure 15:
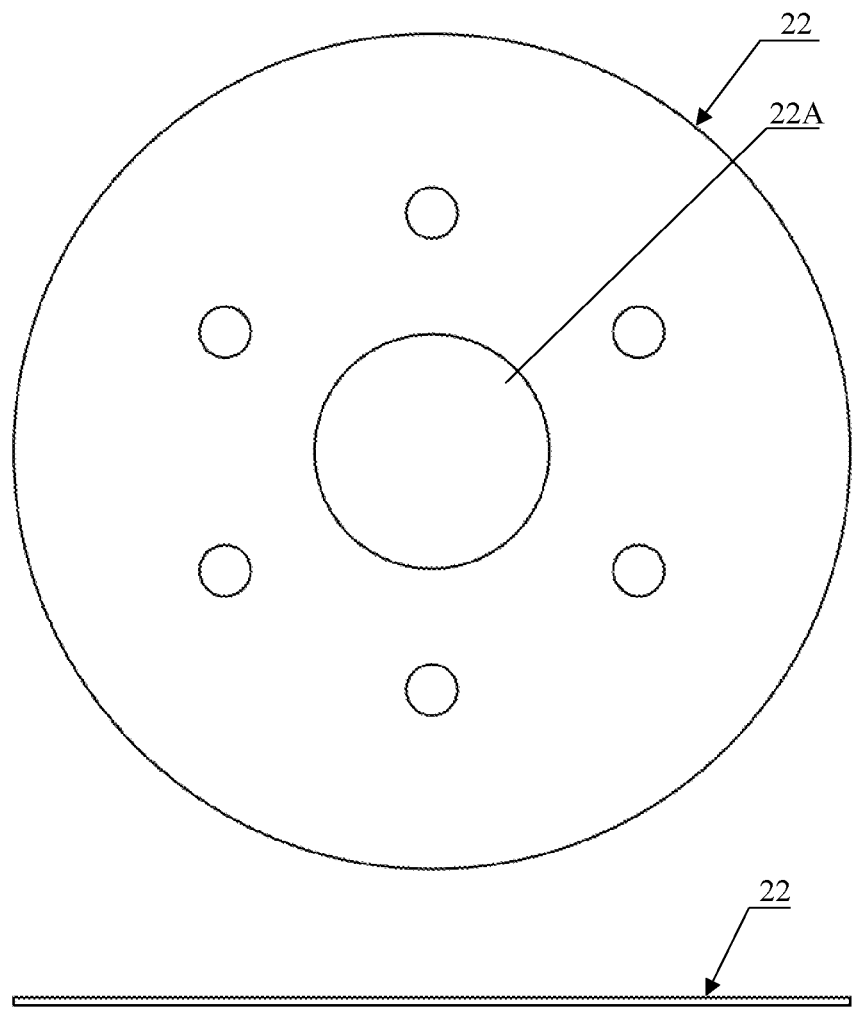
FIG. 15 depicts a two-view drawing of an example of a six-point spherical lifting cell frame hub compression gasket.

FIG. 15 shows an example of a gasket 22. The example gasket 22 depicted in FIG. 15 is flat, and in one example, the gasket 22 is made of butyl rubber. In some examples, the gasket 22 may be made of one or more other suitable, compressible materials. The gasket 22 has an outer diameter equal to the outer diameter of the top surface of the strut receivers when the strut receivers are installed into a hub core plate. One gasket 22 is fitted on either side of the air-impermeable membrane to hold secure and seal the membrane in place at each spherical lifting cell frame hub, and to provide soft membrane contact surfaces to avoid membrane abrasion. As with the hub core plate and the sealing plate, the gasket 22 has central hole 22A to allow air and sensor instrumentation to pass. The gaskets 22 can be produced without initial bolt holes, with the holes drilled or cut to meet the needs of each hub configuration.

Figure 16:
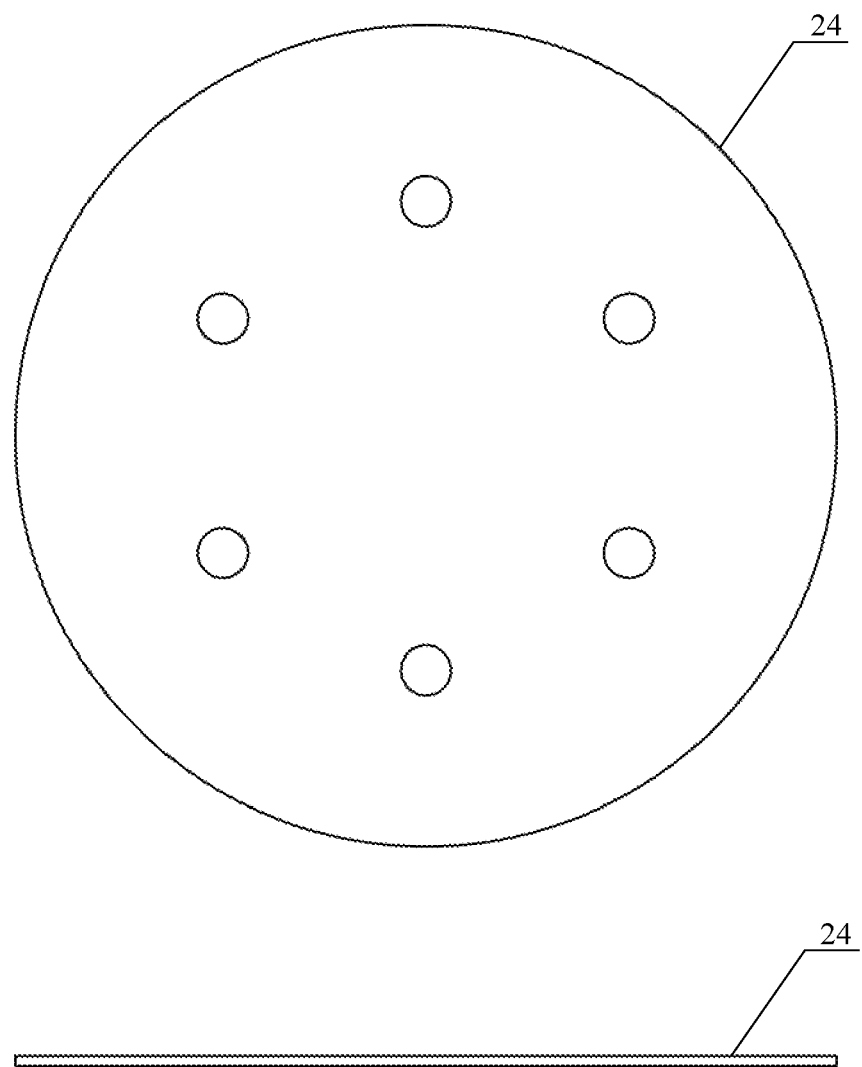
FIG. 16 depicts a two-view drawing of an example of a six-point spherical lifting cell frame hub cover plate.

FIG. 16 shows an example of a hub top cover 24. The hub top cover 24 can be produced without initial bolt holes. It is the same diameter as the gaskets and provides a flat surface on one side for sealing against the gasket, and a flat surface on the other for flat washers, lock washers, and threaded nuts to seat down and compress the gaskets. The hub top cover may be ported to allow threaded plumbing fixtures and sensor instrumentation to be threaded into any hub of a spherical lifting cell frame. High strength and low weight are required for the hub top cover 24. In certain aspects of this disclosure, the hub top cover 24 is manufactured with carbon fiber reinforced polymer, but in other embodiments other materials may be used, such as aluminum or titanium.

In one example, the present disclosure includes a system for the structure of low-pressure, or partial-vacuum, spherical lifting cells for use in lighter-than-air aircraft, that includes an arched strut. In one example, the arched strut is produced from strong, lightweight material. For instance, the arched strut can include a beam-like, C-shaped profile. Further, the arched strut can include a smooth top surface to prevent abrasion of the air-impermeable membrane. Additionally, the arched strut can include rounded corners between the top surface and the sides to prevent abrasion of the air-impermeable membrane. In another example, the arched strut may be produced in continuous lengths that are cut to specific lengths as required for different positions within said spherical lifting cell. For example, the arched strut may be produced with various are radii for different diameters of said spherical lifting cells.

In another example, the present disclosure includes a system for the structure of low-pressure, or partial-vacuum, spherical lifting cells for use in lighter-than-air aircraft, that includes a cable tendon. The cable tendon can be produced using a lightweight, high-tensile-strength, low-stretch woven fiber cord, or cable. The cable tendon may also include a secured loop at each end.

In another example, the present disclosure includes a system for the structure of low-pressure, or partial-vacuum, spherical lifting cells for use in lighter-than-air aircraft, that includes a strut receiver. The strut receiver can be produced using a strong, lightweight material. Further, strut receiver may include a C-shaped slot for fitting onto each end of the arched strut. Additionally, the strut receiver can include a smooth post for the loop of said cable tendon to loop around. In some examples, the strut receiver post includes a threaded, hollow center core for receiving bolts. In one example, the strut receiver has two lower tabs. For instance, the strut receiver may include tabs that extend downward, which are used for fitting into an outer slot in the hub core plate.

In one example, the strut receiver includes a three-sided window having smooth, filleted edges. The smooth, filleted edges can be used to provide passage and/or clearance for the cable tendon. Further, the smooth, filleted edges may prevent an occurrence of abrasions to a surface of the cable tendon. In some examples, the strut receiver includes two slots above said tabs for securing the strut receiver across an outer raised ridge on the hub core plate. Further, the strut receiver may include a flat, smooth top surface. The flat, smooth top surface can enable a gasket to rest atop the strut receiver. In addition, the strut receiver may include a recessed, smooth top surface positioned above a strut receiver post. The recessed, smooth top surface may allow for a hub sealing plate to rest.

In another example, the present disclosure includes a system for the structure of low-pressure, or partial-vacuum, spherical lifting cells for use in lighter-than-air aircraft, that includes a hub core plate. The hub core plate may be produced using a strong, lightweight material. In some examples, the hub core plate is circular. The hub core plate may include a smooth, flat bottom surface for flat washers and bolts to rest. Additionally, the hub core plate may include a central hole that permits a passage of air throughout the structure. Further, the hub core plate can include a raised, cylindrical ridge along an outside edge. The raised, cylindrical ridge can allow for a strut receiver slot to fit onto the hub core plate. In addition, the raised, cylindrical ridge can form one side of the slot into which the strut receiver tabs fit into. Thus, the raised, cylindrical ridge can provide an additional amount of stiffness to the structure.

In some examples, the hub core plate includes two raised, cylindrical ridges-one of which provides an opposing side with a slot for said strut, receiver tabs to fit into, and both of which form a reinforced bolt hole channel. In one example, the hub core plate includes a fourth raised, cylindrical ridge that is used to reinforce a centralized hole. Further, in certain aspects, the hub core plate may be produced without bolt holes. In this case, an absence of bolt holes can allow the hub core plate to be drilled using bolt holes that include either five-point configurations, six-point configurations, or both. Further, producing the hub core plate without bolt holes can allow for a customization of radial angles associated with drilled bolt holes that are positioned around a central axis of the hub core plate. In other aspects, the hub core plate may be produced with bolt holes, having a predetermined, necessary variety of five-point and six-point bolt hole configurations. In this case, the hub core plate may include any number of corresponding, necessary varieties of bolt hole radial angles.

In another example, the present disclosure includes a system for the structure of low-pressure, or partial-vacuum, spherical lifting cells for use in lighter-than-air aircraft, that includes a flat washer, a threaded bolt, and a hub sealing plate. The hub sealing plate may be produced using a strong, lightweight material. Further, the hub sealing plate may be circular. In one example, the hub sealing plate includes a smooth, flat top surface for a gasket to rest. Additionally, the hub sealing plate includes a central hole for permitting the passage of air throughout the structure. In some examples, the hub sealing plate includes a raised, cylindrical tube that extends downward. The raised, cylindrical tube reinforces the central hole, providing an amount of stiffness to the hub sealing plate, while also providing for a passageway for an amount of air flow. The raised, cylindrical tube may include an inside surface, which may be tapped for threads.

According to certain aspects, the hub sealing plate may be produced without bolt holes. In doing so, the hub sealing plate may allow bolt holes to be drilled later, in five-point or six-point configurations, thereby providing a level of customization for radial angles associated with the bolt holes that are positioned around a central axis of the hub sealing plate. In other aspects, the hub sealing plate may be produced with pre-drilled bolt holes having a necessary variety of five-point and/or six-point bolt hole configurations, and having a necessary variety of bolt hole radial angles.

In another example, the present disclosure includes a system for the structure of low-pressure, or partial-vacuum, spherical lifting cells for use in lighter-than-air aircraft, that includes a gasket. The gasket may be produced of a soft, compressible material. The gasket can include a central hole that permits a passage of air.

In another example, the present disclosure includes a system for the structure of low-pressure, or partial-vacuum, spherical lifting cells for use in lighter-than-air aircraft, that includes a membrane. In one example, the membrane is produced using one or more strong, thin, lightweight materials. Further, the membrane may be produced using a single ply or multiple, laminated plies of the thin, lightweight materials. The membrane is highly impermeable to air. In some examples, the membrane is produced in sections, having edges that may be joined and sealed to other membrane sections.

In another example, the present disclosure includes a system for the structure of low-pressure, or partial-vacuum, spherical lifting cells for use in lighter-than-air aircraft, that includes a hub top cover. The hub top cover may be produced using a strong, lightweight material. In one example, the hub top cover is circular. In addition, the hub top cover may include a smooth surface on both sides. According to certain aspects, the hub top cover may be produced without bolt holes, which can allow the hub top cover to be drilled using bolt holes in either five-point or six-point configurations. Producing the hub top cover without bolt holes may allow for a customization of radial angles for each of the bolt holes around a central axis of the hub top cover. In other aspects, the hub top cover may be produced with bolt holes, having a necessary variety of five-point and six-point bolt hole configurations, and having necessary varieties of bolt hole radial angles.

In another example, the present disclosure includes a system for the structure of low-pressure, or partial-vacuum, spherical lifting cells for use in lighter-than-air aircraft, that includes a lock washer and a threaded nut.

In some examples, the arched struts, cable tendons, and hubs form the spherical lifting cell frame of said spherical lifting cell. For instance, the hub core plate having either five or six bolt holes, a set of five or six said strut receivers, a hub sealing plate having either five or six bolt holes, two gaskets having either five or six bolt holes, and a hub top cover having either five or six bolt holes can be bolted together using five or six said bolts, as necessary. In this example, each of the bolts may be secured using two flat washers, a lock washer, and a threaded nut. The bolts, flat washers, lock washer, and threaded nut can be bolted together to form a single hub of a set of hubs that are used in a formation of the spherical lifting cell frame.

In some examples, twelve hubs are implemented in the spherical cell lifting frame. Each of the twelve hubs are configured with five bolt holes, forming five-point hubs. In this example, a remainder of the twelve hubs (e.g., an unused pair of hubs) are required for a construction of the spherical lifting cell frame when configured with six bolt holes, forming six-point hubs. Further, a number of hubs that are required may vary based on an intended geodesic frequency of the spherical lift cell frame being constructed.

And in some examples, each end of the arched strut may be fitted into a C-shaped slot in the strut receiver. In one example, each strut receiver includes a cable tendon looped around a post of the strut receiver at a respective end of the arched strut. In this example, the cable tendon runs parallel to and below the arched strut. The cable tendon provides an amount of tension that is designed to counteract an amount of arch thrust that occurs when the arched strut is under compression. Further, the strut receivers are fitted into tab slots in each of the hub core plates and bolted into place using a flat washer and a bolt, which is threaded through the strut receiver post.

In some examples, the hub sealing plate is fitted down onto the bolts between the main bodies of the strut receivers. For instance, a lower surface of the hub sealing plate may rest on a top, recessed surface of the strut receiver posts such that the top surface of the hub sealing plate and the top surfaces of the strut receivers form a continuous, flat surface. This continuous, flat surface provides a surface area that allows each gasket to rest.

In some examples, the hub top cover may be temporarily placed. In one example, the hub can temporarily secured using flat washers threaded nuts, while the remaining arched struts, cable tendons, and five-point and/or six-point hubs of the spherical lifting cell frame are assembled. For instance, the threaded nuts and hub top covers may be removed from the spherical lifting cell frame. Once removed, the gaskets are fitted over the bolts and set to rest on a top surface of the hub sealing plates and strut receivers. The gaskets provides the hub and the membrane with an airtight seal. In addition, the gaskets protect the membrane from abrasions. And in some examples, sectional pieces of the membrane are placed over the bolts, which rest on the gaskets and cover a surface of the spherical lifting cell frame.

In some examples, the edges of the membrane includes sectional pieces that are seamed together in a manner that makes the edges of the membrane impermeable to air. In one example, gaskets are placed over bolts, which rest on the membrane and provide the hub and the membrane with an airtight seal. Additionally, the placement of the gaskets protect the membrane from abrasions. In some examples, hub top covers are also placed over the bolts that rest on the gaskets. For instance, flat washers may be placed over the bolts that rest on the hub top covers. In another example, the lock washers are placed over the bolts that rest on said flat washers. Further, threaded nuts may be used to tighten the bolts, thereby securing the spherical lifting cell.

In some examples, one or more said hubs may be ported through said top cover and said membrane. In one example, the center core of the hub sealing plates may be tapped with threads to receive plumbing fittings. Tapping the center core of the hub sealing plates may allow for a movement of air in and out of the spherical lifting cell. Further, one or more said hubs may be ported through the top cover and the membrane, and the center core of said hub sealing plates can be tapped with threads. In doing so, hubs may be able to receive instrumentation for sensors that monitor conditions within the spherical lifting cell.

In another example, the present disclosure includes a system for the structure of low-pressure, or partial-vacuum, spherical lifting cells for use in lighter-than-air aircraft, that includes one or more said hubs which may be ported through the top cover and the membrane, and the center core of the hub sealing plates may be tapped with threads. In doing so, the one or more hubs can receive a pressure relief valve that is configured to protect the spherical lifting cell from over-pressurization. Further, the one or more said hubs may be ported through the top cover and the membrane, and the center core of the hub sealing plates may be tapped with threads that is configured to receive a vacuum relief valve to protect said spherical lifting cell from under-pressurization. Additionally, the one or more the hubs may be ported through the top cover and the membrane, and the center core of the hub sealing plates tapped with threads to receive threaded connectors. These thread connectors may be used to attach the spherical lifting cell to the airframe of the low-pressure, or partial-vacuum, lighter-than-air aircraft.

In some examples, the spherical lifting cells of various diameters and various geodesic frequencies may be constructed using the same set modular parts of the hubs described above. In one example, the spherical lifting cell provides an air-impermeable envelope which may be partially evacuated of air for the purpose of air displacement, thereby providing aerostatic lift in a lighter-than-air aircraft. Further, the spherical lifting cells may be used singularly or in a group to provide the aerostatic lift for a lighter-than-air aircraft.

In some examples, the system includes a subsystem for regulating an amount of pressure within the spherical lifting cells. In this example, the subsystem includes: a photovoltaic array that can convert solar energy into electrical energy. The subsystem further includes a charge controller or controllers and a battery. The battery may be a collection of galvanic cells that can store of electrical energy. Further, the charge controller or controllers regulate an amount of electrical current coming from the photovoltaic array by passing the amount of electrical current to the battery for storage. In doing so, the charge controller or controllers protects the battery from overcharge and/or overheating.

In another example, the present disclosure includes a system for the structure of low-pressure, or partial-vacuum, spherical lifting cells for use in lighter-than-air aircraft, that includes a motor controller or controllers and an electric motor or motors. In one example, the motor controller or controllers is operable by an operator and regulates the amount of electrical current that is provided to the electric motor or motors.

In another example, the present disclosure includes a system for the structure of low-pressure, or partial-vacuum, spherical lifting cells for use in lighter-than-air aircraft, that includes a compressor or compressors. The system further includes a pipe T-joint or joints, an inline valve or valves, a check valve or valves, and a spherical lifting cell or cells. In this example, the spherical lifting cell or cells are in fluid communication with the compressor or compressors. Further, the compressor or compressors are in fluid communication with the pipe T-joint or joints. The pipe T-joint or joints are in fluid communications with the check valve or valves. In addition, the pipe T-joint or joints are in fluid communication with said inline valve or valves. And the check valve or valves are in fluid communication with the atmosphere external to said lighter-than-air aircraft.

In this example, the check valve or valves allow for a passage of air out of the system. Further, the check valve or valves prevents a passage of air back into the system. The inline valve or valves are in fluid communication with the atmosphere that is external to the lighter-than-air aircraft. And in this example, an operator may ascend in the lighter-than-air aircraft by closing the inline valve or valves. Further, the operator may turn on the motor controller or controllers to ascend in the lighter-than-air aircraft.

Continuing with this example, the motor controller or controllers can send an electrical current from the battery to the electric motor or motors. In response, the electric motor or motors turns the compressor or compressors, which pumps air out of the spherical lifting cell or cells. After air passes through the compressor or compressors, the air passes through the pipe T-joint or joints, through the check valve or valves, and the air passes into the atmosphere—outside said lighter-than-air aircraft.

In some examples, the air is displaced from the spherical lifting cell to generate aerostatic lift. In one example, the lighter-than-air aircraft ascends. In this example, the system includes an air pressure gauge or gauges. The air pressure gauge or gauges are used for monitoring the air pressure within the spherical lifting cell or cells. The system further includes a pressure relief valve or valves, which are installed in said spherical lifting cell or cells. The pressure relief valve or valves may prevent an over-pressurization of the spherical lifting cell or cells. Further, the system includes a vacuum relief valve or valves that are installed in the spherical lifting cell or cells. The vacuum relief valve or valves may prevent under-pressurization of the spherical lifting cell or cells.

In some examples, the lighter-than-air aircraft includes multiple spherical lifting cells. The amount of pressure within these spherical lifting cells may be controlled in conjunction or independently. For example, when an operator desires to stop ascending in the lighter-than-air aircraft, the operator may turn off the motor controller or controllers, and the lighter-than-air aircraft stops ascending when the aerostatic lift of said lighter-than-air aircraft reaches equilibrium with the external atmosphere. In addition, when the operator desires to descend in the lighter-than-air aircraft, the operator can open the inline valve or valves, which allows air to pass through the inline valve or valves from the atmosphere that is outside of lighter-than-air aircraft. The outside air passes through the compressor or compressors and into the spherical lifting cell or cells. The spherical lifting cell or cells refill with air. As a result, the aerostatic lift of the spherical lifting cell or cells is reduced and the lighter-than-air aircraft descends.

In some examples, the system includes a subsystem for energy recovery in a solar-electric, low-pressure, or partial-vacuum, lighter-than-air aircraft that includes a photovoltaic array that converts solar energy into electrical energy. The subsystem for energy recovery also includes a charge controller or controllers and a battery. The battery may be understood to be a collection of galvanic cells for the storage of electrical energy. The charge controller or controllers regulates the electrical energy coming from the photovoltaic array, passing the electrical energy to the battery for storage and protecting the battery from overcharging and/or overheating. Further, the subsystem for energy recovery includes a motor controller or controllers and an electric motor or motors. The motor controller or controllers is operable by an operator and regulates the amount of electrical energy going to the electric motor or motors.

In one example, the present disclosure includes a system for energy recovery in a solar-electric, low-pressure, or partial-vacuum, spherical lifting cells for use in lighter-than-air aircraft, also includes a compressor or compressors. In this example, the electric motor or motors turn the compressor or compressors. The system for energy recovery in a solar-electric, low-pressure, or partial-vacuum, spherical lifting cells for use in lighter-than-air aircraft, further includes an airflow management system that is operable by an operator and allows for the control of the flow of air into and out of one or more low-pressure, or partial-vacuum, lifting envelope or envelopes; a low-pressure, or partial-vacuum, lifting envelope or envelopes. The low-pressure, or partial-vacuum, lifting envelope or envelopes are in fluid communication with said compressor or compressors. Additionally, the compressor or compressors are in fluid communication with the airflow management system.

In some examples, the airflow management system is in fluid communication with the atmosphere that external to said lighter-than-air aircraft. In one example, when an operator desires to ascend in the lighter-than-air aircraft, the operator operates the motor controller or controllers to draw electrical energy from the battery, which causes the electric motor or motors to turn the compressor or compressors. In response, the compressor or compressors evacuate air from the low-pressure, or partial-vacuum, lifting envelope or envelopes by pumping said air to the airflow management system. The airflow management system allows the air in the low-pressure, or partial-vacuum, lifting envelope or envelopes to exit said lighter-than-air aircraft and prevents any reentry of the air. As a result, the air is displace from the lighter-than-air aircraft, which creates aerostatic lift.

In some examples, the lighter-than-air aircraft ascends in altitude by expending electrical energy. For example, when an operator desires to descend in the lighter-than-air aircraft, the operator may operate the airflow management system to allow for an amount of air from the external atmosphere to come into the lighter-than-air aircraft via the compressor or compressors. In one example, an inrush of such air into the compressor or compressors can cause the compressor or compressors to act as an expander or expanders, thereby converting an amount of energy from the inrush of the air. For instance, the inrush of air may create a movement that is converted into a rotational motion.

In some examples, the rotational motion turns the electrical motor or motors, causing the electrical motor or motors to act as an electrical generator or generators. Further, this rotational motion may be converted into electrical current. Such electrical current can be conducted and sent to the motor controller or controllers. Further, the motor controller or controllers may conducts the electrical current that is sent to the charge controller or controllers. In some examples, the charge controller or controllers conducts electrical current that is sent to the battery, where the electrical current is stored.

In some examples, air begins refilling the low-pressure, or partial-vacuum, lifting envelope or envelopes. For instance, an amount of aerostatic lift may be reduced, causing the lighter-than-air aircraft to descend. And in some examples, a portion of the electrical energy which had been expended during ascension of said lighter-than-air aircraft may be recovered during the descent of said lighter-than air aircraft.

Advantages of the Invention

In order to ascend, a solar-electric, lighter-than-air aircraft utilizing a low-pressure, spherical lifting cell(s) would expend electrical energy running a vacuum pump(s) to evacuate air from the spherical lifting cell(s), creating low pressure, or partial vacuum, for aerostatic lift. One of the advantages of the present invention, is that the pressure differential created between the interior of the spherical lifting cell(s) and the external atmosphere may be leveraged for energy recovery, as the same electric-motor-driven vacuum pump(s) used to evacuate the spherical lifting cell(s) during ascent may be used as an expander(s) driving the electrical motor(s) as a generator(s) producing electric current when the air flow is reversed in the system during descent.

Another advantage of the invention is that a lighter-than-air aircraft utilizing a low-pressure, spherical lifting cell(s) is capable of true vertical takeoff and landing, eliminating the requirement for developed runways. This differs, particularly, from the current trend in hybrid lighter-than-air aircraft, which require a runway for takeoff and landing because they rely, not only on aerostatic lift, but also forward movement to generate dynamic lift in order to gain altitude.

An additional advantage of the invention is that a solar-electric, lighter-than-air aircraft utilizing a low-pressure, spherical lifting cell(s) for aerostatic lift does not consume fuel or produce emissions in order to attain or maintain altitude.

Another advantage of the invention is elimination of the need for utilizing helium as a lifting gas, as helium is both heavier than air at low to medium vacuum (achievable with a single stage vacuum pump) and a non-renewable resource.

An additional advantage of the invention is that a solar-electric, lighter-than-air aircraft utilizing a low-pressure, spherical lifting cell(s) would be able to occasionally run the vacuum pump(s) to maintain low pressure within the spherical lifting cell(s) in the event of a leak, or due to air seepage through the membrane, and as the batteries may be recharged with the solar array, allows such an aircraft to potentially remain aloft nearly indefinitely.

Another advantage of the invention is that a low-pressure, spherical lifting cell system does not require compressed gas cylinders for lifting gas storage, or buoyancy compensation devices, such as ballonets and ballast, for successful operation, meaning the aircraft systems are simplified, reducing overall complexity and weight.

An additional advantage of the invention is that a lighter-than-air aircraft utilizing a low-pressure, spherical lifting cell(s) provides the operator far more control over the buoyancy of the aircraft as the density within the spherical lifting cell(s) can be adjusted by varying the pressure within the spherical lifting cell(s). Air is either pumped out of the spherical lifting cell(s) to increase aerostatic lift or allowed to refill the spherical lifting cell(s) to decrease aerostatic lift. This contrasts with conventional lighter-than-air aircraft, which must either drop (a limited supply of) ballast to increase aerostatic lift or release (a limited supply of) lifting gas to decrease aerostatic lift.

Another advantage of the invention is that a lighter-than-air aircraft utilizing a low-pressure, spherical lifting cell(s) retains its structural integrity on the ground without pressurization with lifting gas, having more ground stability and gust resistance than conventional lighter-than-air aircraft, as the spherical lifting cell(s) can be allowed to fill to ambient pressure with air, having zero aerostatic lift, and a heavier resting weight. This improves safety and reduces the need for large ground-handling crews, specialized mooring facilities, or the addition of ballast during cargo offloading, as is typical of conventional lighter-than-air aircraft.

An additional advantage of the invention is that the true spherical nature of the lifting cell frame created by using arched struts is an improvement in strength over traditional geodesic constructions, which only approximate spheres with a plurality of flat triangles created with straight struts.

Another advantage of the invention is that the arch in the strut resists the bending moment of the compressive load by conducting the load to the hubs, preserving compression and structural integrity by tending to push the struts into the strut receivers of the hubs, whereas the straight struts of a traditional geodesic construction under compression, would tend to experience flexure, pulling the struts out of the of the strut receivers, creating a potential loss of structural integrity, and buckling.

An additional advantage of the invention is that the lightweight cable tendon attached to each hub and running parallel beneath each arched strut resists, with tension, the arch thrust created by the compressive force applied to the arched strut.

Another advantage of the invention is that the combination of an arched strut reinforced by a cable tendon dramatically lowers the weight of the required structure, as would be required without the lightweight cable tendons.

An additional advantage of the invention is that the modularity of the spherical lifting cell structural system simplifies manufacture and construction, leading to lower cost, since the same small set of reproducible components can be used to create all the required hubs, arched struts, and cable tendons.

General Considerations

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. An aerostatic lift system for a lighter-than-air aircraft, the system comprising:
a partial-vacuum spherical lifting cell comprising an air-impermeable membrane coupled to a geodesic frame;
a vacuum pump coupled to the partial-vacuum spherical lifting cell and configured to, along with a control valve, control an amount of air within the partial-vacuum spherical lifting cell, wherein the vacuum pump is configured to adjust in altitude along with the partial-vacuum spherical lifting cell;
an electric motor coupled to the vacuum pump, wherein the electric motor is configured to activate the vacuum pump to evacuate air from the partial-vacuum spherical lifting cell, wherein the electric motor is configured to adjust in altitude along with the partial-vacuum spherical lifting cell; and
an airflow management system communicatively coupled to the vacuum pump,
wherein the airflow management system is configured to increase an altitude of the partial-vacuum spherical lifting cell by causing the vacuum pump to create an outflow of air from the partial-vacuum spherical lifting cell, wherein the airflow management system is configured to decrease the altitude of the partial-vacuum spherical lifting cell by opening the control valve to external air to create an inflow of air through the vacuum pump and into the partial-vacuum spherical lifting cell, wherein the lighter-than-air aircraft is configured to recover electrical energy as the partial-vacuum spherical lifting cell decreases in altitude due to the vacuum pump, through interaction with the inflow of air therethrough, driving the electric motor to cause recovery of the electrical energy at a same time as the inflow of the air into the partial-vacuum spherical lifting cell causes the decrease in the altitude of the partial-vacuum spherical lifting cell.

2. The aerostatic lift system of claim 1, wherein the partial-vacuum spherical lifting cell includes an icosahedron-based geodesic frame.

3. The aerostatic lift system of claim 1, wherein the air-impermeable membrane comprises a single ply polymer.

4. The aerostatic lift system of claim 1, wherein the air-impermeable membrane comprises multiple, laminated plies of a polymer.

5. The aerostatic lift system of claim 1, wherein the air-impermeable membrane comprises an aluminized biaxially-oriented polyethylene terephthalate that includes heat-sealed edges.

6. The aerostatic lift system of claim 1, wherein the air-impermeable membrane comprises:
  a first biaxially-oriented polyethylene terephthalate; and
  a second biaxially-oriented polyethylene terephthalate, wherein the second biaxially-oriented polyethylene terephthalate is an aluminized biaxially-oriented polyethylene terephthalate.

7. The aerostatic lift system of claim 6, wherein the air-impermeable membrane further comprises:
  a woven mesh fiber cord positioned between the first biaxially-oriented polyethylene terephthalate and the second biaxially-oriented polyethylene terephthalate, wherein the first biaxially-oriented polyethylene terephthalate is layered onto the second biaxially-oriented polyethylene terephthalate with a 90 degree bias.

8. The aerostatic lift system of claim 1, wherein the geodesic frame comprises a plurality of modular parts that includes a plurality of arched-beam struts, a plurality of cable tendons, and a plurality of modular hubs, wherein each of the plurality of arched-beam struts are attached to two respective hubs of the plurality of modular hubs, wherein each of the plurality of arched-beam struts possess an arched shape, wherein the arched shape conducts load acting on each of the plurality of arched-beam struts to the two respective hubs.

9. The aerostatic lift system of claim 8, wherein each arched-beam strut of the plurality of arched-beam struts includes a first end and a second end, wherein a respective cable tendon of the plurality of cable tendons extends from the first end to the second end of each arched-beam strut, and wherein the plurality of cable tendons are configured to generate tension to counteract compression of the plurality of arched-beam struts.

10. The aerostatic lift system of claim 8, wherein the air-impermeable membrane is coupled to the each of the plurality of modular hubs of the geodesic frame by a sealing gasket and a cover plate, and wherein the sealing gasket is configured to provide an airtight seal and to prevent an abrasion of the air-impermeable membrane.

11. The aerostatic lift system of claim 1, further comprising:
  a pressure sensor configured to detect an amount of pressure in the partial-vacuum spherical lifting cell, wherein the airflow management system is configured to control the vacuum pump based in part on the amount of pressure in the partial-vacuum spherical lifting cell.

12. The aerostatic lift system of claim 1, further comprising:
  a photovoltaic array configured to convert solar energy to electrical energy;
  a rechargeable battery configured to receive the electrical energy from the photovoltaic array; and
  a charge controller configured to regulate an amount of electrical energy provided to the rechargeable battery from the photovoltaic array.

13. The aerostatic lift system of claim 12, wherein the electric motor is configured to draw the electrical energy from the rechargeable battery and drive the vacuum pump.

14. The aerostatic lift system of claim 1, further comprising:
  a rechargeable battery configured to store electrical energy from a charge controller,
  wherein the vacuum pump is configured to provide a high-pressure inflow of air that causes rotation of the electric motor to recover the electrical energy, and wherein the charge controller receives the electrical energy recovered by the electric motor and stores the electrical energy in the rechargeable battery.

15. The aerostatic lift system of claim 1, further comprising at least one of a pressure relief valve configured to prevent an over-pressurization of the partial-vacuum spherical lifting cell or a vacuum relief valve configured to prevent an under-pressurization of the partial-vacuum spherical lifting cell.

16. The aerostatic lift system of claim 1, wherein the partial-vacuum spherical lifting cell defines only one internal volume that is configured to receive gaseous substances, and wherein the internal volume is configured to receive external air therein.

17. The aerostatic lift system of claim 1, wherein no helium or hydrogen are used other than those naturally present in the external air.

18. An aerostatic lift system for a lighter-than-air aircraft, the system comprising:
  a plurality of partial-vacuum spherical lifting cells, each partial-vacuum spherical lifting cell comprising an air-impermeable membrane coupled to a geodesic frame;
  a plurality of vacuum pumps, wherein each vacuum pump is coupled to a respective partial-vacuum spherical lifting cell of the plurality of partial-vacuum spherical lifting cells and wherein each vacuum pump is configured to, along with a respective control valve, control an amount of air within the respective partial-vacuum spherical lifting cell, wherein each vacuum pump is configured to adjust in altitude along with the respective partial-vacuum spherical lifting cell;
  one or more electric motors coupled to the plurality of vacuum pumps, wherein the one or more electric motors are configured to activate the plurality of vacuum pumps to evacuate air from the plurality of partial-vacuum spherical lifting cells, and wherein each electric motor of the one or more electric motors is configured to adjust in altitude along with a partial-vacuum spherical lifting cell of the plurality of partial-vacuum spherical lifting cells; and
  a plurality of airflow management systems, each airflow management system of the plurality of airflow management systems communicatively coupled to a vacuum pump of the plurality of vacuum pumps,
  wherein each airflow management system is configured to decrease the internal pressure of a first respective partial-vacuum spherical lifting cell and to increase an altitude of the first respective partial-vacuum spherical lifting cell by causing the first vacuum pump to create an outflow of air from the first respective partial-vacuum spherical lifting cell, wherein each airflow management system is configured to increase the internal pressure of the first respective partial-vacuum spherical lifting cell and to decrease the altitude of the first respective partial-vacuum spherical lifting cell by opening the respective control valve to external air to create an inflow of air through the vacuum pump and into the first respective partial-vacuum spherical lifting cell, wherein the lighter-than-air aircraft is configured to recover electrical energy as the plurality of partial-vacuum spherical lifting cells increase their internal pressure due to the plurality of vacuum pumps, through interaction with the inflow of air therethrough, driving the one or more electric motors to cause recovery of the electrical energy at a same time as the inflow of the air into the plurality of partial-vacuum spherical lifting cells, and wherein the plurality of partial-vacuum spherical lifting cells, the plurality of vacuum pumps, and the plurality of electric motors are configured to decrease in altitude as the plurality of lifting cells increase in internal pressure.

19. An aerostatic lift system for a lighter-than-air aircraft, the system comprising:
- a partial-vacuum spherical lifting cell comprising an air-impermeable membrane coupled to a geodesic frame;
- a vacuum pump coupled to the partial-vacuum spherical lifting cell and configured to, along with a control valve, control an amount of air within the partial-vacuum spherical lifting cell, wherein the vacuum pump is configured to adjust in altitude along with the partial-vacuum spherical lifting cell;
- a motor coupled to the vacuum pump and configured to activate the vacuum pump to evacuate air from the partial-vacuum spherical lifting cell, wherein the motor is configured to adjust in altitude along with the partial-vacuum spherical lifting cell;
- an airflow management system communicatively coupled to the vacuum pump, wherein the airflow management system is configured to increase an altitude of the partial-vacuum spherical lifting cell by causing the vacuum pump to create an outflow of air from the partial-vacuum spherical lifting cell, wherein the airflow management system is configured to decrease the altitude of the partial-vacuum spherical lifting cell by causing the vacuum pump to create an inflow of air through the vacuum pump and into the partial-vacuum spherical lifting cell, wherein the lighter-than-air aircraft is configured to recover electrical energy as the partial-vacuum spherical lifting cell decreases in altitude due to the vacuum pump, through interaction with the inflow of air therethrough, driving the motor to cause recovery of the electrical energy at a same time as the inflow of the air into the partial-vacuum spherical lifting cell causes the decrease in altitude of the partial-vacuum lifting cell, wherein airflow through the vacuum pump is configured to cause the motor to rotate.

20. The aerostatic lift system of claim 19, further comprising:
- a rechargeable battery,
- wherein mechanical energy caused by rotation of the motor is converted to the electrical energy, and wherein the rechargeable battery is configured to store the electrical energy.

\* \* \* \* \*